Dec. 6, 1932.  A. ALTIERI  1,889,767
PROPELLER
Filed Sept. 15, 1931
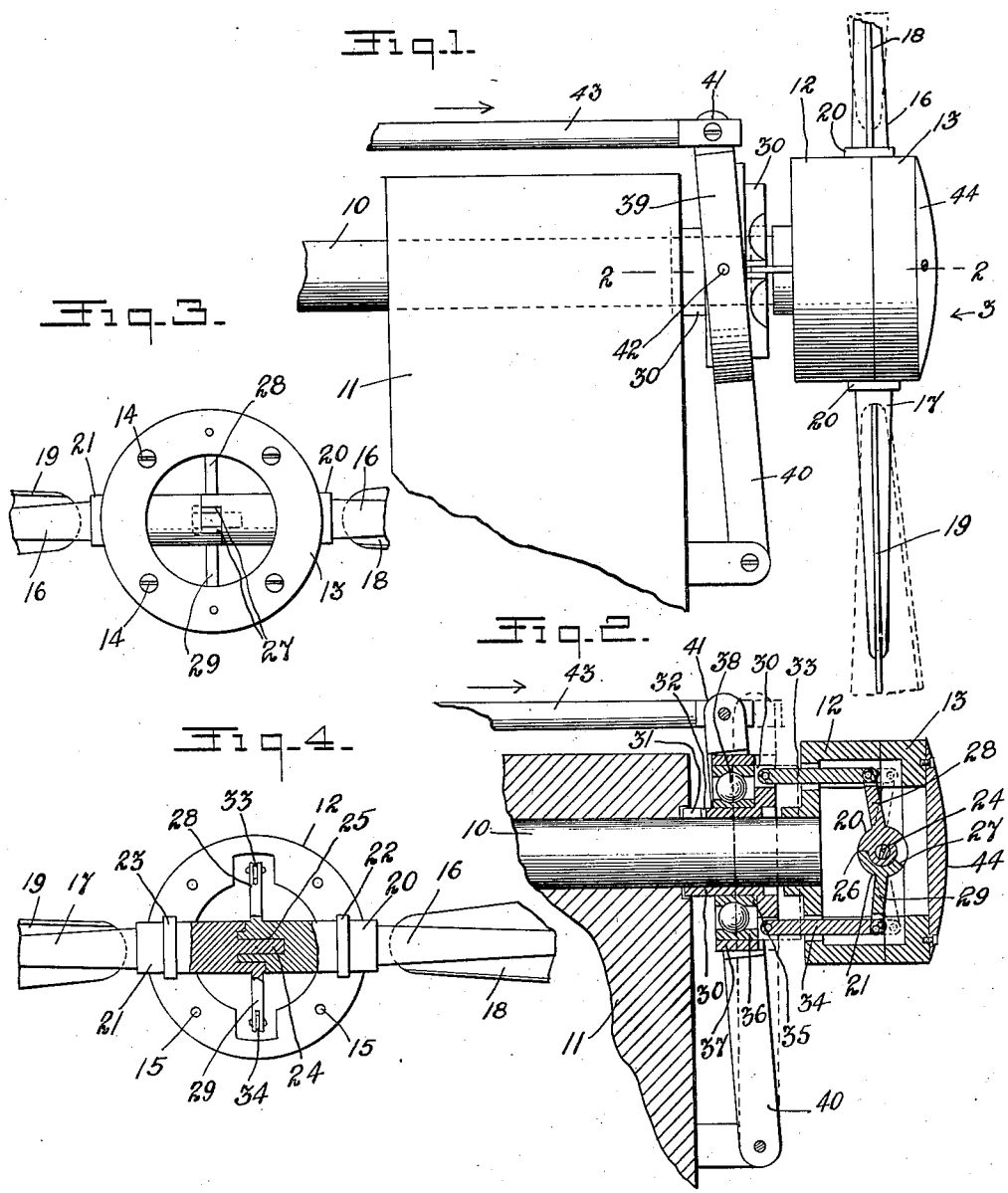
WITNESS:
INVENTOR
Alexander Altieri
BY
Joshua R. H. Potts
HIS ATTORNEY Patented Dec. 6, 1932

1,889,767

UNITED STATES PATENT OFFICE

ALEXANDER ALTIERI, OF PHILADELPHIA, PENNSYLVANIA

PROPELLER

Application filed September 15, 1931. Serial No. 562,853.

This invention relates to propellers, and has for an object to provide a propeller having blades adjustable to pitch, and improved means for adjusting the blades.

A further object of the invention is to provide a propeller having oppositely extending blades supported by diametrically alined shafts, with means for oscillating the shafts simultaneously in opposite directions for effecting the pitch of the blades.

The invention therefore comprises in combination with a shaft to rotate the propeller, a hub secured to the shaft into which diametrically alined shafts are journaled, carrying blades, said shafts having oppositely extending arms with a sliding collar upon the shaft connected with the arms, the sliding of which oscillates the shafts of the blades and therefore feathers the blades in opposite directions.

The drawing illustrates an embodiment of the invention, and the views therein are as follows.

Figure 1 is a view of the propeller in side elevation,

Figure 2 is a view of the propeller, taken on line 2—2 of Figure 1,

Figure 3 is a view of the propeller in end elevation, with the cap removed, and

Figure 4 is a view of the hub in end elevation, with the collar detached, and showing inner ends of the propeller shafts partly in section.

Like characters of reference indicate corresponding parts throughout the several views.

In carrying out the present invention, a shaft 10 is journaled in any convenient supporting structure as the part 11. It is to be understood that the shaft may be of any length desired, and supported in any kind of bearings found convenient. Upon the end of the shaft, a hub 12 is fixed, and upon the outer end of this hub 12, a ring 13. The ring 13 is secured to the hub 12 in any approved manner, as by bolts or screws 14 in the holes 15 in the hub. This ring 13, together with the hub 12 serves to journal shafts 16 and 17, carrying respectively, propeller blades 18 and 19. Integral with or as a rigid extension of the shafts 16 and 17, trunnions 20 and 21 are journaled between said ring and hub, and preferably, collars 22 and 23 are formed upon said trunnions to prevent the dislodgment of the shafts 16 and 17 and trunnions 20 and 21 by centrifugal force. One of these trunnions, as the trunnion 21, is provided with a reduced extremity 24 which fits into a complementary socket 25 in the end of the other trunnion so that the ends of both of these trunnions are held thereby in alinement. The trunnions are provided with overlapping parts forming shoulders 26 and 27 limiting the relative oscillation of the trunnions and shafts within the hub.

Each of the trunnions is provided with an arm, the trunnion 20 carrying the arm 28 and the trunnion 21 carrying the arm 29, the arms 28 and 29 lying in the same plane diametrical of the hub 12. The trunnions and their accompanying shafts 16 and 17, and blades 18 and 19 are, therefore, oscillated by the actuation of these arms 28 and 29.

For the purpose of oscillating the arms 28 and 29, a collar 30 is fitted slidingly upon the shaft 16 to rotate therewith, but slide longitudinally thereof, such provision being made by the slot 31 and pin 32. This collar 30 is connected with the arms 28 and 29 through the medium of links 33 and 34, lying in the same diametrical plane with the arms 28 and 29, so that as the collar 30 is slidably moved upon the shaft 10, the blades 18 and 19 will be rotated.

For the purpose of manually controlling the sliding of this collar 30, a ball race is provided, one section 35 being rigidly connected with the collar 30, and the outer section 36 rigidly connected with the ring 37, with balls 38 interlying these sections of ball race.

Surrounding the ring 37 is a hoop 39 connected at the lower side as the bar 40, and at the upper end connected as ears 41. This hoop 39 is connected through the pivots 42 with the ring 37 so that as the hoop and lever are moved from full line to dotted line position, as shown at Figure 2, the ring 30 will move therewith, and also move the arms 28 and 29 to dotted line position and therefore, rotate the blades.

Any convenient means is employed for operating this hub and lever being represented conventionally as a bar 43, extending to any position, and provided with any means for manipulating. While forming no particular part of the invention, the front end of the hub will, in practice, be closed by a cap 44.

As shown in full lines, at Figure 1, the blades 18 and 19 of the propeller are set at neutral, and will rotate without effect. By moving the rod 43 in the direction of the arrow toward or to the dotted line position at Figure 2, the trunnions 20 and 21 and the shafts 16 and 17, will be oscillated, and therewith, the blades 18 and 19 to effect the change of pitch. It will be obvious, therefore, that the pitch of this propeller may be varied while operating to any pitch desired by the operator.

Of course, the propeller, herein illustrated, may be modified in various ways without departing from the invention herein set forth and hereinafter claimed.

The invention is hereby claimed as follows:

1. A propeller comprising a hub, shafts extending diametrically from the hub, propeller blades carried by the shafts, arms lying in a plane perpendicular to and extending radially from the shafts within and diametrically of the hub, links connected with and lying in the plane of the arms, and a slidable collar connected with the links and adapted to vary the pitch of the blades.

2. A propeller comprising a driving shaft, a hollow hub rigidly connected with the driving shaft, propeller shafts inserted diametrically through and into the hub and forming interconnecting bearings therein, arms lying in the same plane extending radially and oppositely from said inserted ends of the shaft and diametrically of the hub, links extending rearwardly from said arms and outwardly through the hub and lying in the plane of the arms, a collar mounted to slide longitudinally upon and rotate with the driving shaft, means connecting the links with said collar, a ring mounted to journal said collar, and means to apply manual stress to said ring to move said collar longitudinally upon the driving shaft.

3. A propeller comprising a driving shaft, a hollow hub rigidly secured to the driving shaft, propeller shafts inserted diametrically into and through the hollow hub, one of said shafts having an interconnecting bearing within the end of the other shaft, arms extending radially and oppositely from said interconnected ends in a plane diametrically of the hub, links extending rearwardly from said arms and lying in the same plane with the arms and extending without the hub, a collar mounted to slide upon and rotate with the shaft, means pivotally connecting the links with said collar, and manual means to move the collar longitudinally upon the shaft.

4. A propeller comprising a hub, shafts disposed radially of the hubs with blades on their exterior ends and with their interior ends overlapped in part, arms upon the overlapped parts lying in a plane perpendicular to the shafts, links connected to and lying in the plane of the arms, and means without the hub to apply actuating stress to the links.

5. A propeller comprising a hub, shafts disposed radially of the hubs with blades on their exterior ends and with their interior ends overlapped in part, arms upon the overlapped parts lying in a plane perpendicular to the shafts and diametrical of the hub, links connected to and lying in the plane of the arms, and means without the hub to apply actuating stress to the links.

In testimony whereof I have signed my name to this specification.

ALEXANDER ALTIERI.